United States Patent
Lyle et al.

(10) Patent No.: US 12,346,977 B1
(45) Date of Patent: Jul. 1, 2025

(54) SYSTEM AND METHOD TO ENABLE AUGMENTED INTELLIGENCE GUIDED HELP

(71) Applicant: UIPCO, LLC, San Antonio, TX (US)

(72) Inventors: Ruthie D. Lyle, Durham, NC (US); Sean Carl Mitchem, San Antonio, TX (US); Ravi Durairaj, San Antonio, TX (US); Mark Anthony Lopez, Helotes, TX (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/585,514

(22) Filed: Feb. 23, 2024

Related U.S. Application Data

(62) Division of application No. 17/356,592, filed on Jun. 24, 2021, now Pat. No. 11,989,786.

(60) Provisional application No. 63/046,268, filed on Jun. 30, 2020.

(51) Int. Cl.

| | |
|---|---|
| *G06Q 40/00* | (2023.01) |
| *G06N 3/08* | (2023.01) |
| *G06N 5/01* | (2023.01) |
| *G06Q 30/016* | (2023.01) |
| *G06Q 40/08* | (2012.01) |
| *G06T 19/00* | (2011.01) |
| *G10L 15/22* | (2006.01) |

(52) U.S. Cl.
CPC ............ *G06Q 40/08* (2013.01); *G06N 3/08* (2013.01); *G06N 5/01* (2023.01); *G06Q 30/016* (2013.01); *G06T 19/006* (2013.01); *G10L 15/22* (2013.01)

(58) Field of Classification Search
CPC ........ G06Q 40/08; G06Q 30/016; G06N 3/08; G06N 5/01; G06T 19/006; G10L 15/22
USPC .............. 705/35, 38, 39, 40, 45, 37, 4, 5, 2; 709/226, 201, 227; 704/9; 701/425; 455/406; 715/753; 726/9, 6; 706/25, 45
See application file for complete search history.

(56) References Cited

U.S. PATENT DOCUMENTS

| | | | |
|---|---|---|---|
| 6,810,383 B1 | 10/2004 | Loveland | |
| 7,953,615 B2 | 5/2011 | Aquila | |
| 8,407,137 B2 * | 3/2013 | Thomas | G06Q 20/10 |
| | | | 705/38 |
| 8,799,034 B1 | 8/2014 | Brandmaier | |
| 9,495,380 B2 * | 11/2016 | Kling | H04L 63/10 |

(Continued)

OTHER PUBLICATIONS

Redefining Banking and Financial Industry through the application of Computational Intelligence; 2019 Advances in Science and Engineering Technology International Conferences (ASET) (pp. 1-5); Princy Agarwal; Mar. 1, 2019. (Year: 2019).*

(Continued)

*Primary Examiner* — Tien C Nguyen
(74) *Attorney, Agent, or Firm* — Plumsea Law Group, LLC

(57) ABSTRACT

A system and method for using an augmented intelligence guide system to assist users, customers, members, and other users of a service (for example, a financial service or an insurance service) in completing a task or process to improve the success rate of the accurate completion of the steps necessary to execute the task or process is described. The system includes a process detection module, an experience determination module, an assistance classification module, and a guidance engine.

20 Claims, 10 Drawing Sheets

(56) References Cited

U.S. PATENT DOCUMENTS

| | | | | |
|---|---|---|---|---|
| 10,657,963 | B2* | 5/2020 | Cha | G10L 15/22 |
| 10,678,570 | B2* | 6/2020 | Zarlengo | G06F 3/0482 |
| 10,755,348 | B2* | 8/2020 | Buckwalter | G06Q 40/03 |
| 10,896,469 | B1 | 1/2021 | Jenkins | |
| 11,127,082 | B1 | 9/2021 | Gore | |
| 11,477,191 | B2* | 10/2022 | Funane | H04L 63/0861 |
| 2013/0041722 | A1* | 2/2013 | Schimelman | G06Q 10/06393 |
| | | | | 705/7.39 |
| 2014/0365355 | A1* | 12/2014 | Shvarts | G06Q 40/08 |
| | | | | 705/38 |
| 2016/0240050 | A1* | 8/2016 | Block | G06Q 20/1085 |
| 2016/0262017 | A1* | 9/2016 | Lavee | G06F 21/31 |
| 2021/0201169 | A1 | 7/2021 | Fung Moo | |
| 2021/0365955 | A1 | 11/2021 | Galante | |

OTHER PUBLICATIONS

Business Intelligence and Business Process Management in Banking Operations; 2007 29th International Conference on Information Technology Interfaces (pp. 57-62); K. Curko, M.P. Bach, G. Radonic; Jun. 1, 2007. (Year: 2007).*

Artificial Intelligence in Financial Services—Need to Blend Automation with Human Touch; 2019 International Conference on Automation, Computational and Technology Management (ICACTM) (pp. 342-347); Anupam Mehrotra; Apr. 24, 2019. (Year: 2019).

Non-Final Office Action mailed Sep. 15, 2023 for U.S. Appl. No. 17/356,592.

Intelligent Financial Development Based on Artificial Intelligence; 2020 2nd International Conference on Applied Machine Learning ( ICAML) (pp. 195-199); Yuanyuan Hong; Oct. 16, 2020. (Year: 2020).

Notice of Allowance mailed Jan. 31, 2024 for U.S. Appl. No. 17/356,592.

Non-Final Office Action mailed May 24, 2023 for U.S. Appl. No. 17/356,592.

* cited by examiner

SYSTEM AND METHOD TO ENABLE AUGMENTED INTELLIGENCE GUIDED HELP

CROSS-REFERENCE TO RELATED APPLICATIONS

This application is a Divisional of, and claims benefit to, U.S. patent application Ser. No. 17/356,592 filed on Jun. 24, 2021 and titled "System and Method to Enable Augmented Intelligence Guided Help"; which in turn claims the benefit of Provisional Patent Application No. 63/046,268, filed Jun. 30, 2020, and titled "System and Method to Enable Augmented Intelligence Guided Help". The disclosures of every application listed above are incorporated by reference in their entirety for all purposes.

TECHNICAL FIELD

The present disclosure generally relates to using an augmented intelligence guide system to improve a user's experience, and in particular, to using the augmented intelligence guide system to assist users in completing a task.

BACKGROUND

Many users may find certain processes or tasks difficult to successfully complete. For example, repairing a device or appliance, completing a financial transaction in a digital space, and reviewing documents are some types of tasks or processes that many people find difficult, confusing, tedious, and/or frustrating to complete. Additionally, human error or misunderstanding of instructions can further cause unforeseen problems, resulting in a frustrating and intimidating experience for users. Often, to make sense of a task or process, a user must contact a representative of the service provider (such as an automated help line, an interactive bot, a customer service representative, or other customer relations agent).

Users needing to contact a service representative of the service provider, whether to discuss a document they received or another issue, are often subjected to an automated menu, or phone tree, such as an interactive voice response (IVR) menu common in the customer service industry. Rather than being able to reach a representative immediately, a user must take time to answer predetermined questions that act to direct the user to the correct department, a specific representative, or a recording of information.

Even when a representative has been reached, a user may become frustrated with the interaction as the kind of information that can be conveyed over the phone is limited. As an example, if a representative is describing a part of instructions that a user recently received, the conversation may be frustrating to both parties since the representative has to explain verbally where to look on the instructions, rather than being able to "show" the user where to look, as they could do if the two were meeting in person.

Additionally, conversations between users and representatives can be difficult because the representative often lacks context for the user's state of mind, the user's environment, and even the user's technological capabilities.

There is a need in the art for a system and method that addresses the shortcomings discussed above.

SUMMARY

In one aspect, a computer implemented method includes steps of establishing communication with a device operated by a user, receiving information from the device indicating that the user has initiated a process, monitoring input from the device as the user performs the process, and determining, using an experience determination module, a user level of experience for performing the process. The method further includes steps of passing the monitored input and the user level of experience into an assistance classification module and outputting an assistance class value and automatically assisting the user in completing the process based on the outputted assistance class value.

In another aspect, a computer implemented method includes steps of storing first guided instructions for assisting users with a predetermined process and storing second guided instructions for assisting users with the predetermined process, where the second guided instructions are more detailed than the first guided instructions. The method further includes steps of establishing communication with a device operated by a user, receiving information from the device indicating that the user has initiated a process, monitoring input from the device as the user performs the process, and determining, using an experience determination module, a user level of experience for performing the process. The method further includes steps of passing the monitored input and the user level of experience into an assistance classification module and outputting an assistance class, where the assistance class has a first classification value and a second classification value, and where the first classification value is associated with less assistance than the second classification value. The method further includes steps of selecting the first guided instructions when the assistance class has the first classification value, selecting the second guided instructions when the assistance class has the second classification value, and automatically assisting the user in completing the process using the selected first guided instructions or the selected second guided instructions.

In another aspect, a computing system includes a device processor and a non-transitory computer readable medium storing instructions that are executable by the device processor. The system also includes an augmented intelligence guide system with a process detection module configured to detect when a user has initiated a process, an experience determination module configured to determine a user experience level for the initiated process, an assistance classification module configured to output an assistance class value in response to sensed input, and a guidance engine configured to guide a user through one or more steps of the initiated process when the assistance class value indicates that the user needs assistance.

In one aspect, a method of using an augmented intelligence guided assistant to assist users in completing a task is provided.

In another aspect, a system for using an augmented intelligence guided assistant to assist users in completing a task is provided.

In another aspect, a computer program product embodied in a non-transitory, physical storage device having instructions for implementing a method of using an augmented intelligence guided assistant to assist users in completing a task is provided.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
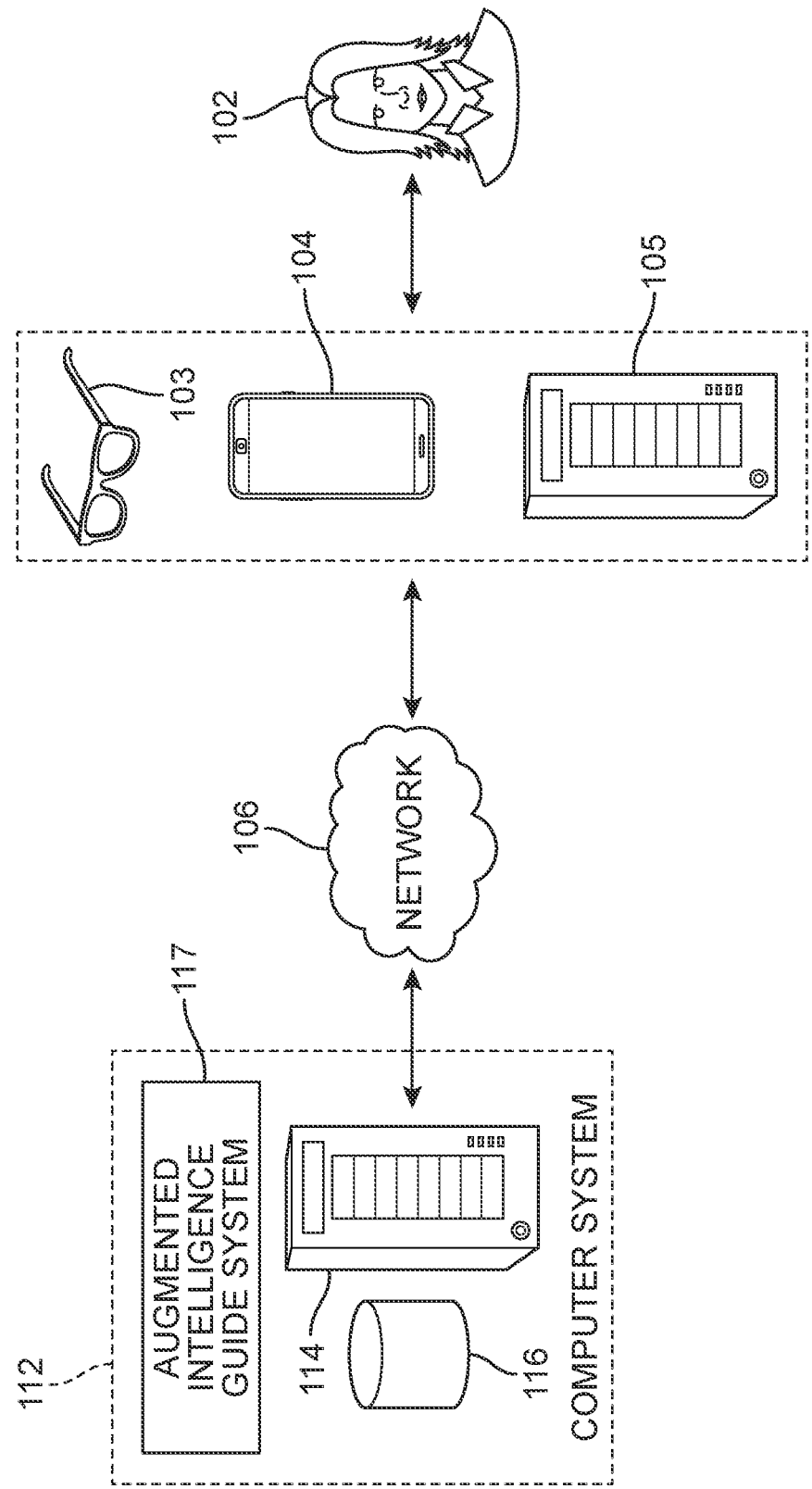
FIG. 1 is a schematic view of an augmented intelligence guide system to assist users in completing a task, according to an embodiment.

The embodiments provide a system and method for using an augmented intelligence guide system (AIGS) to assist users, customers, members, and other users of a service (for example, a financial service or an insurance service) in completing a process or task in a manner that improves user satisfaction.

Automated assistants are intended to help users complete processes, which may also be referred to as tasks. From a technical perspective, these automated assistants often lack the ability to infer when a user may need assistance completing a process (or task), and may therefore rely on explicit prompts from the user to initiate assistance. Alternatively, many systems use simple triggers to determine when to initiate assistance, and those simple triggers may result in many "false positives," in which users do not actually want or need assistance. Additionally, many automated assistants may rely on a script or "one size fits all" approach to helping the user, in which the type of guidance provided does not consider context such as user experience.

The exemplary embodiments provide a system and method that improve the operation of automated assistants by enhancing the ability of the automated assistant to detect when a user is in need of assistance without any prompting from the user, and using a variety of different inputs so that the system is not over-reliant on simple triggers that may result in offering assistance when it is unwanted or unneeded. Additionally, the exemplary embodiments provide a system and method that improve the operation of automated assistants by determining a user's experience level in assessing the type of assistance to provide, and by selecting an appropriate set of instructions for guiding the user based on their needs and determined experience level.

The example embodiments described herein make use of methods and systems in artificial intelligence, which may be used to implement augmented intelligence techniques. As used herein, "artificial intelligence" may include any known methods or techniques in machine learning and related fields. As examples, artificial intelligence may include systems and methods used in natural language processing (NLP) and similar fields. Augmented intelligence may include techniques for assisting a human with a companion software algorithmic process that may use artificial intelligence, in some embodiments.

The embodiments describe systems and methods for assisting users in completing various kinds of processes. Generally, processes comprise a sequence of steps that a user must complete. For example, insurance adjusters may perform a sequence of steps related to claim adjustment, including steps of interviewing insured parties and other bystanders, assessment of the damage, capturing images of damaged property or objects, determining initial cost estimates, and determining follow-on member actions to be taken. In many situations, the process may be complex and may involve various sub steps and/or sub processes.

FIG. 1 is a schematic view of some of the systems, components and devices that may be used to facilitate interactions between a service provider and a user 102. The service provider may be a company or any other organization that provides services to users. In one embodiment, the service provider could be a bank. In another embodiment, the service provider could be an insurance company. In another embodiment, the service provider could be a company that provides banking services and insurance services as well as other kinds of services. User 102 could be a customer, or member, or could be any other user of services provided by the service provider.

In some embodiments, a customer service system (or department) of a service provider may include at least one computer system 112. The term "computer system" refers to the computing resources of a single computer, the partial computing resources of a single computer, a plurality of computers communicating with one another, or a network of remote servers. In an exemplary embodiment, computer system 112 includes at least one server.

In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network, including network 106. Databases 116 can include any kind of storage devices, including but not limited magnetic, optical, magneto-optical, and/or memory, including volatile memory and non-volatile memory.

In some embodiments, a customer service system (or department) of a service provider may be configured to allow a customer or user (e.g., user 102) to interact with and/or receive assistance from the customer service system in different ways. In the example embodiments, a customer or user may interact with the customer service system through a website, an application (e.g., a "mobile app"), a telephone system, using an augmented reality (AR) system, or other mechanisms. For example, user 102 may use an AR device (also referred to as an AR enabled device), such as AR eyeglasses 103, to interact with an AR system of the customer service system. User 102 may also use a mobile device 104, such as a mobile phone or tablet computer, to interact with a website and/or an application of the customer service system of the service provider. User 102 may also use a computer 105, such as a desktop or laptop computer, to interact with a website of the customer service system of the service provider. In other embodiments, user 102 may interact with the customer service system of the service provider in other ways, such as through a conventional landline telephone or other audio and/or visual mechanisms.

Any of the embodiments of a user device (e.g., AR eyeglasses 103, mobile device 104, and/or computer 105) shown in FIG. 1 may include computer systems for processing and communicating information. Each device may generally include a processor, a data storage component and a display. Each device may also include components to facilitate communication with external systems (for example, hardware and software components to enable communication over a network). In some cases, a device includes one or more input devices. These could include a keyboard, mouse, or one or more physical buttons integrated into a case of the device. In some cases, a device includes touchscreen controls.

A user device could operate in a client-server relationship with one or more servers of computer system 112. For example, computer system 112 may include a server that communicates with a user device (e.g., AR eyeglasses 103, mobile device 104, and/or computer 105) as well as other remote devices over network 106. The user device may provide the front-end of a system that provides users with options for performing various kinds of tasks (for example, making fund transfers when the company is a bank). In some cases, the user device may run client software through a web browser, in which case the client software may be hosted on a server associated with computer system 112. In other cases, the user device may run client software in the form of a native software application that has been downloaded through a centralized marketplace (i.e., an "app store"). In some cases, while the client software that allows users to perform various tasks may be run on the user device, the data may be retrieved from and stored on databases associated with computer system 112.

For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

In some embodiments, computer system 112 of the customer service system may include an augmented intelligence guide system 117. As used herein, the term "augmented intelligence guide system" refers to a system that can guide customers or users through a process by leveraging machine intelligence. An augmented intelligence guide system may comprise one or more intelligent assistants (or virtual assistants), that can interact and/or speak to a user and understand a user's text responses and/or spoken words. Voice assistants, along with chat bots, may be more generally referred to as conversational interfaces (or CUIs), whose purposes are to mimic conversations with a real human. However, it may be appreciated that an augmented intelligence guide system could also incorporate other components that facilitate guidance which may not be considered part of a virtual assistant.

Additionally, in some embodiments, augmented intelligence guide system 117 may include a virtual assistant presented to a user in the form an AR avatar or overlay that can be displayed within the user's AR device, such as AR eyeglasses 103.

It may be appreciated that the embodiments are not limited to use with customer service systems. In some cases, guide system 117 could interface with an internal employee service system, which could be used by bank tellers, insurance adjusters, and other suitable employees, for example. In other cases, guide system 117 could interface with any other suitable system.

Figure 2:
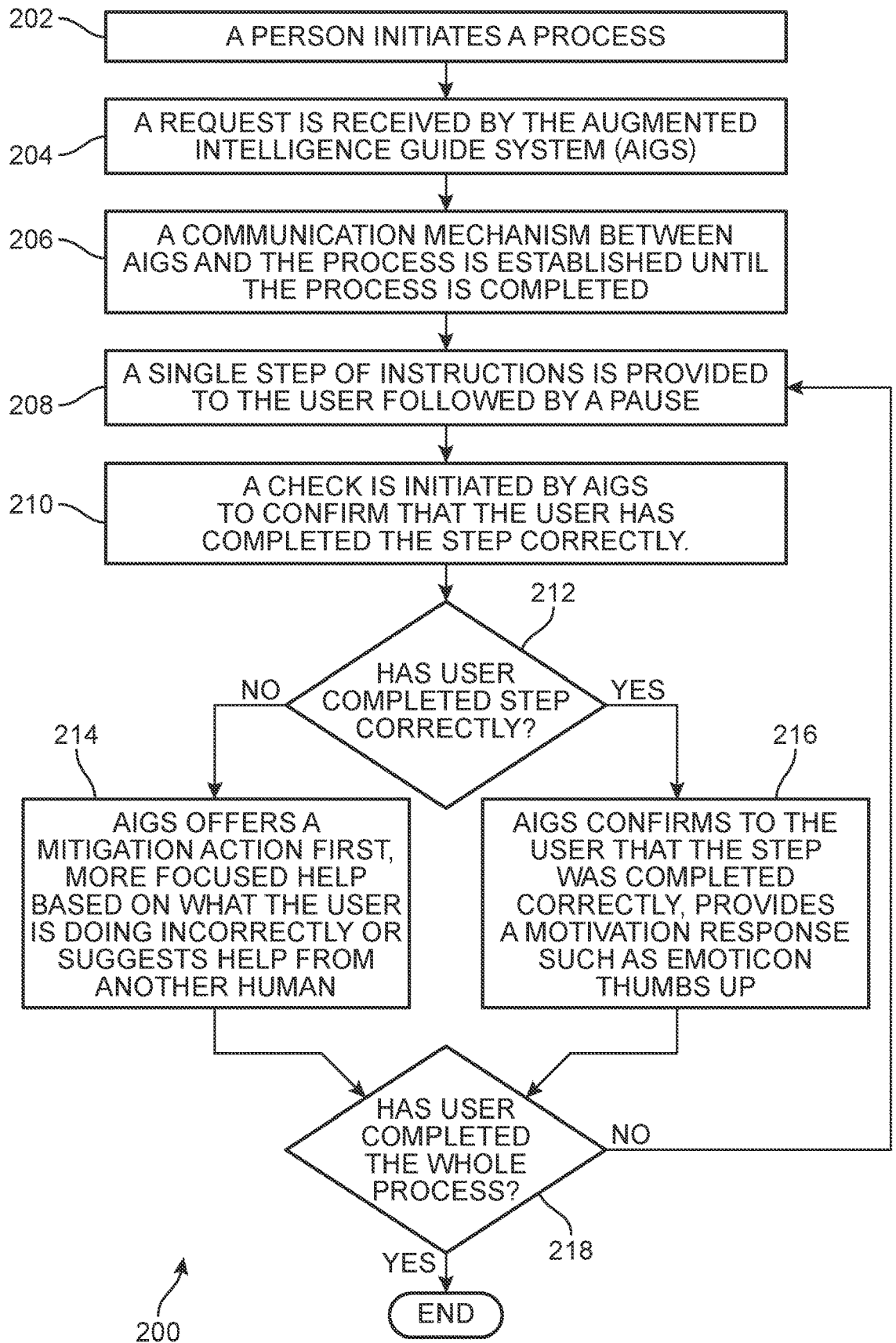
FIG. 2 is a flowchart of a method for using an augmented intelligence guide system to assist users in completing a task, according to an embodiment.

Referring to FIG. 2, a flowchart of a method 200 for using an augmented intelligence guide system to assist users in completing a task is shown according to an embodiment. Moreover, FIG. 2 is intended as a general method for implementing guided instructions to a user performing a task in response to receiving a user request for assistance. As described in further detail below, in other cases the guide system can automatically determine when a user is in need of assistance.

In some embodiments, method 200 may be implemented by at least one processor associated with a computer system of the service provider, for example, computer system 112. In this embodiment, method 200 begins at a step 202 where a person initiates a process. For example, the process may be repairing a device or appliance, completing a financial transaction in a digital space (e.g., a website or mobile app), reviewing documents, following a step-by-step guide, or other performing another suitable task or process.

Next, method 200 may proceed to a step 204. At step 204, a request is received by the augmented intelligence guide system, for example, augmented intelligence guide system 117 of the service provider's customer service system. At step 206, a communication mechanism between the augmented intelligence guide system and the process or task for which assistance is requested is established. In an example embodiment, at step 206, augmented intelligence guide system 117 may establish communication with a device of the user. In particular, communication is established with at least one application on the device that is operable by the user. For example, if user 102 requests assistance from augmented intelligence guide system 117 through AR eyeglasses 103, a communication mechanism in the form of an AR system overlay or avatar may be used to communicate with user 102. Similarly, if user 102 requests assistance from augmented intelligence guide system 117 through mobile device 104 or computer 105, a communication mechanism in the form of a virtual assistant on the website or mobile app being used.

Next, method 200 may proceed to a step 208, where a single step of instructions is provided to the user, followed by a pause to allow the user time to complete the step. At a step 210, a check is initiated by the augmented intelligence guide system (e.g., augmented intelligence guide system 117) to confirm that the user has completed the step correctly. For example, in some cases, the augmented intelligence guide system may be configured to learn over time and use historical experiences to improve suggested actions to the user.

Method 200 may then proceed from to step 210 to confirm if a user has completed the step correctly, based on the check performed in step 212. If not, the system proceeds to step 214. At step 214, the augmented intelligence guide system can first offer a mitigation action to the user, more focused help based on what the user is doing incorrectly, or suggest receiving help from another human, such as a customer service representative. If the user completes the step correctly, the system proceeds to step 216, where the augmented intelligence guide system confirms to the user that the step was completed correctly and can provide a motivation response, such as an emoticon thumb-up or check mark. After step 214 or step 216, method 200 proceeds to step 218. At step 218, a check is initiated by the augmented intelligence guide system to confirm completion of the process or task for which the user has requested help.

Upon determining at step 218 that the process has not yet been completed, then method 200 proceeds back to step 208 for the next step in the process and is followed by another iteration of step 212, step 214, step 216, and/or step 218. These steps may be repeatedly iterated multiple times until each step of instructions associated with the task or process to be completed has been performed correctly and completed by the user. Once the process or task has been completed, the method ends. In some cases, the augmented intelligence guide system (for example, augmented intelligence guide system 117) may inform the user that the assistance is complete and terminate the communication session with the user. In some cases, a confirmation from the user that the user is satisfied with the assistance may also be included so that the communication session is not ended unless the user is satisfied with the assistance received.

Figure 3:
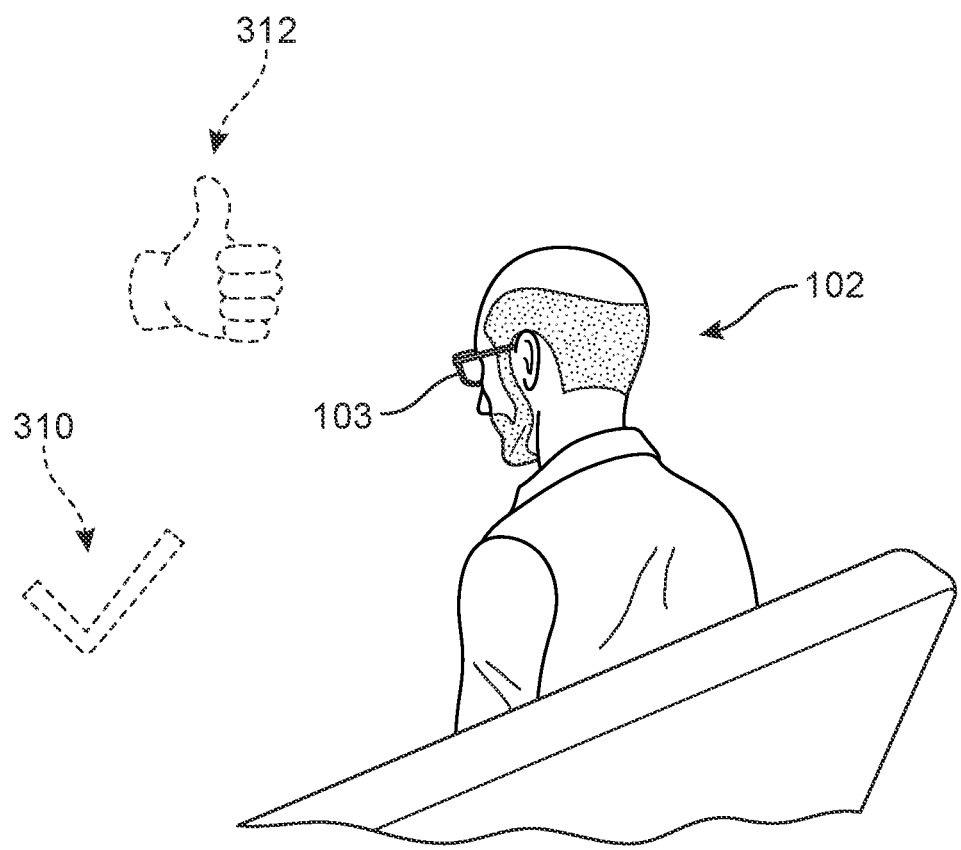
FIG. 3 is a schematic view of a situation where a user receives feedback from an augmented intelligence guide system to complete a task, according to an embodiment.

Referring now to FIG. 3, an example embodiment of a situation where a user receives assistance from an augmented intelligence guide system to complete a task is shown. For example, FIG. 3 may depict a step of method 200, described above. Specifically, FIG. 3 shows the system providing visual feedback when the step has been performed correctly. As shown in FIG. 3, user 102 is using AR eyeglasses 103 to interact with the augmented intelligence guide system of the service provider (e.g., augmented intelligence guide system 117). In this embodiment, augmented intelligence guide system 117 confirms to user 102 that the step was completed correctly by providing a motivation response, such as a virtual check mark 310 and/or an emoticon thumb-up 312, that can be seen by user 102 through AR eyeglasses 103. Similar responses may be provided to user 102 when using other user devices, such as on a display of mobile device 104, and/or computer 105.

Figure 4:
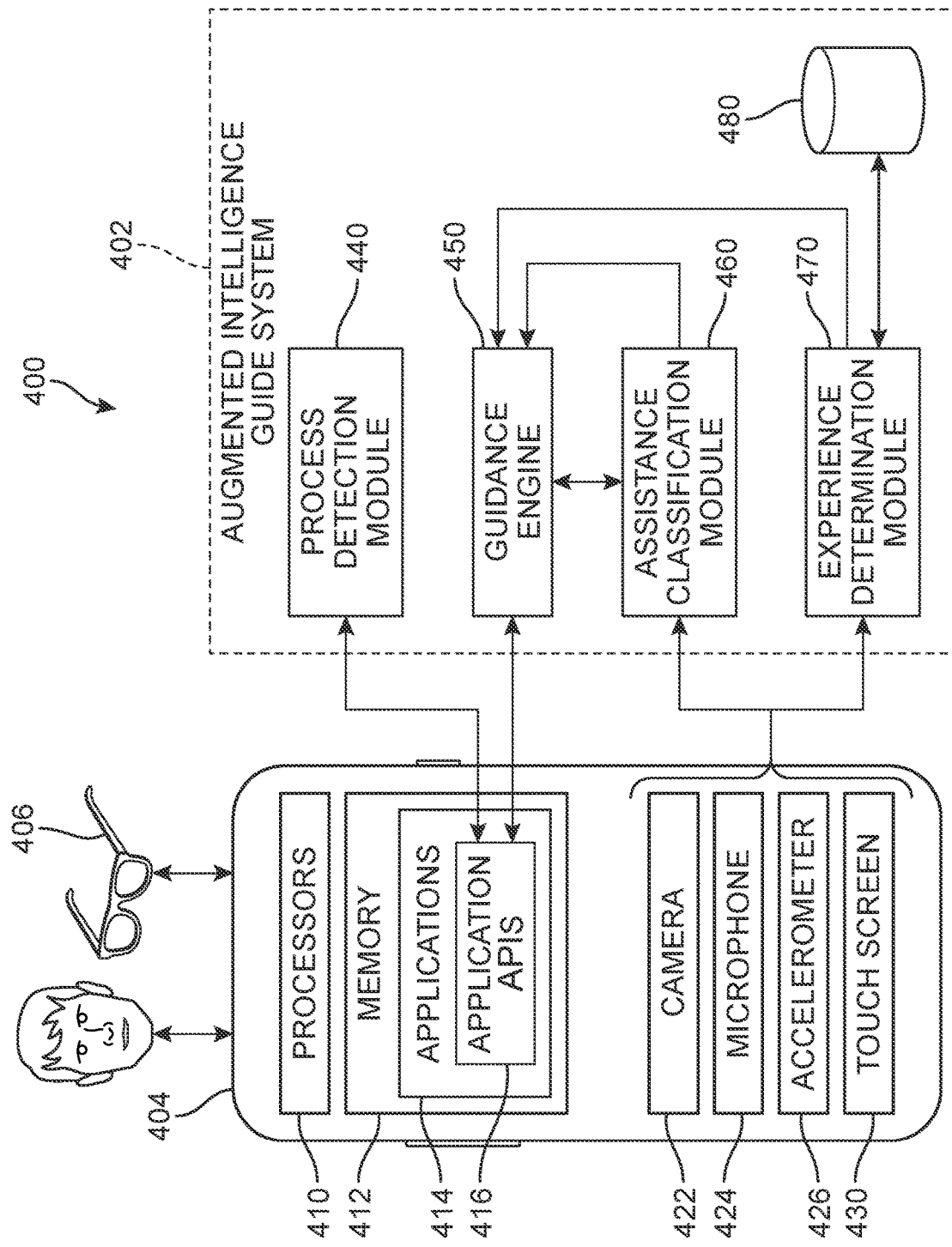
FIG. 4 is a schematic view of a computing environment including an augmented intelligence guide system that communicates with a mobile device, according to an embodiment.

FIG. 4 is a schematic view of a computing environment 400 with augmented intelligence guide system in communication with one or more computing devices. In this exemplary embodiment, guide system 402 can communicate with a mobile device 404. Moreover, in this example, mobile device 404 is in communication with AR glasses 406. It may be appreciated, however, that in other embodiments, guide system 402 could communicate directly with AR glasses 406. Also, it may be appreciated that in different embodiments, guide system 402 could run locally on mobile device 404, run in the cloud, or on any other suitable computing device(s).

Mobile device 404 may include processors 410 and memory 412. Member 412 may store one or more software applications 414. In some cases, one or more software applications 414 include application program interfaces (APIs) 416. Applications 414 could include any software applications that are necessary for a user to perform a particular process.

Mobile device 404 may further include various sensors such as camera 422, microphone 424, and accelerometer 426. In addition, mobile device 404 may include a touch screen 430. Touch screen 430 provides an interface for a user to input information, as well as a screen for viewing information.

Guide system 402 may include one or more modules. As seen in FIG. 4, guide system 402 includes a process detection module 440. Process detection module 440 may be configured to detect when a user has initiated a particular process (or task). In some cases, process detection module 440 may communicate directly with one or more software APIs 414 on mobile device 404. Thus, in some cases, if a user is initiating a process through a software application running on his or her mobile device, process detection module 440 may be alerted via ongoing communication with APIs 414. Alternatively, in other embodiments, process detection module 440 may detect when a user has initiated a new process based on various other kinds of inputs, including information sensed using components of mobile device 404. For example, in some cases a user could audibly announce their intention to begin a process, which could be detected by microphone 424, and then interpreted by a natural language processing (NLP) system running on mobile device 404 or a remote system in communication with guide system 402.

Guide system 402 may also include a guidance engine 450. In some cases, guidance engine 450 includes functionality for interfacing with a user via voice, text, or any other suitable channels. In particular, guidance engine 450 may communicate with mobile device 404 (as well as AR glasses 406) to prompt a user when providing assistance.

Guide system 402 may also include assistance classification module 460. Assistance classification module 460 may receive input from multiple sources. In some cases, assistance classification module 460 may receive input from one or more sensors or components of mobile device 404. Based on monitoring these various inputs, assistance classification module 460 can continuously check to see if a user is in need of assistance once they have initiated a process. Although not shown in FIG. 4, in some cases, assistance classification module 460 could receive inputs from sensors or components associated with glasses 406.

Guide system 402 may further include an experience determination module 470. Experience determination module 470 may be configured to determine an experience level of a user that has initiated a process.

Guide system 402 may further include a database 480. In some cases, database 480 could store information that is specific to particular users so that the information can be retrieved by one or more systems. As described in further detail below, experience determination module 470 may retrieve information about a user in order to assess the user's experience level.

Figure 5:
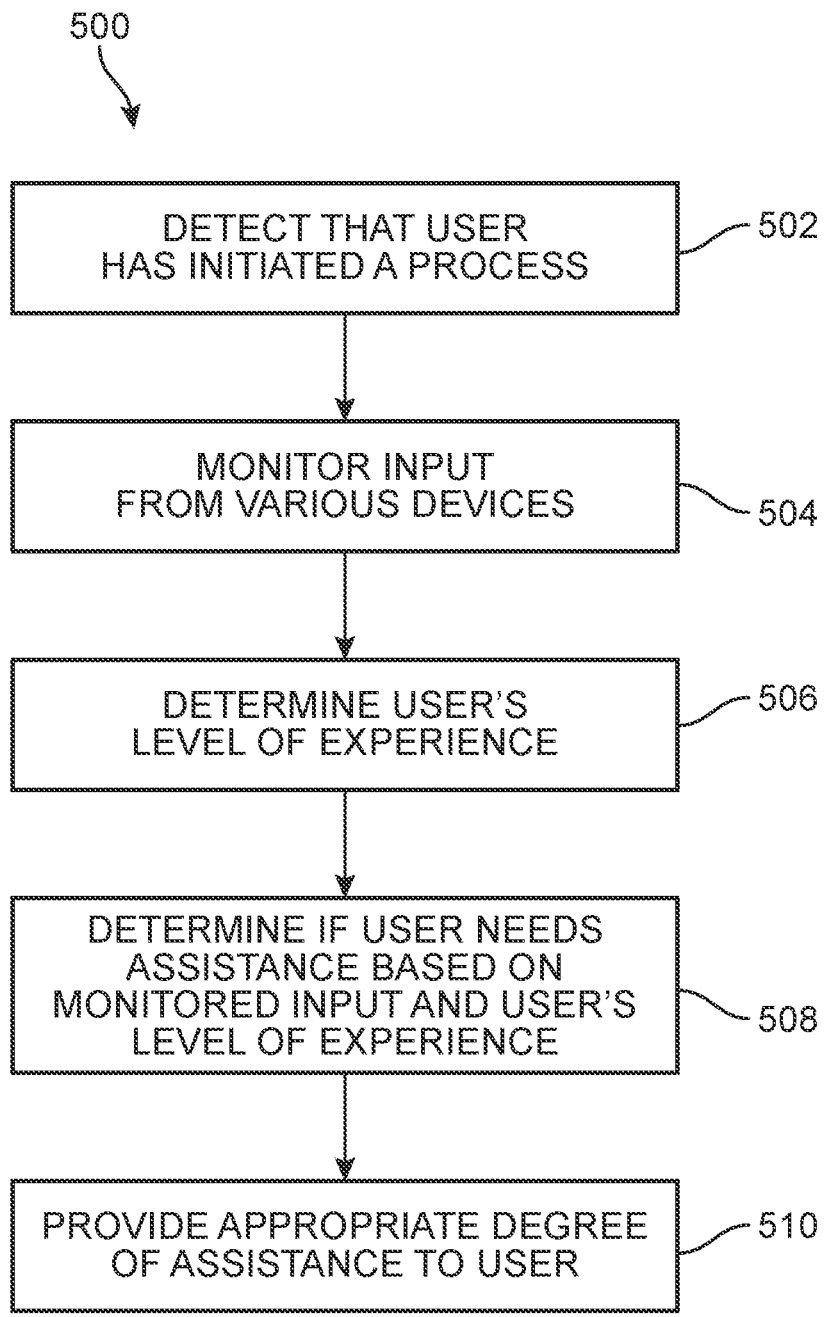
FIG. 5 is a flowchart of a method for detecting that a user needs assistance and for providing assistance to the user, according to an embodiment.

FIG. 5 is a schematic view of a general process 500 that may be performed by a guide system, such as guide system 402 of FIG. 4. Starting in step 502, guide system 402 may detect that a user has initiated a process while interacting with various devices. Exemplary processes can include adjusting insurance claims, detecting fraudulent claims, and participating in financial transactions. In some cases, the step of detecting a new process may be performed by a process detection module (such as process detection module 450). The detection module could receive notification that the user has initiated a process from an application API. For example, if the user is an insurance adjuster, guide system could detect when the adjuster opens a software application or website used during the claim adjustment process. As another example, the detection module could receive audio and or video information that is interpreted and used to detect that the user has initiated a particular process or task.

Next, in step 504, guide system 402 may monitor input from various devices. This input could be received from sensors or other systems of a mobile device such as a phone, AR glasses, a wearable device, or any other suitable system.

In step 506, guide system 402 may determine a user's level of experience. In some cases, this could be determined from historical information. In other cases, this could be determined by prompting a user to provide their experience level directly. In other cases, this could be inferred by analyzing various kinds of input, such as the user's speech patterns or nonverbal behaviors.

In step 508, guide system 402 may determine if a user needs assistance based on monitored input. In some cases, guide system 402 could also factor in a user's level of experience when determining whether or not to provide assistance. For example, if the user has a lot of experience in performing a particular process or task, the system may not intervene with assistance except in very rare cases, since experienced users may become more frustrated with unwanted assistance. In some cases, guide system 402 may process the monitored input as well as the user's level of experience using an assistance classification module (such as assistance classification module 460).

Finally, in step 510, guide system 502 may provide an appropriate degree of assistance to the user. In some cases, a guidance engine, which may include a chat bot, voice assistant, or other suitable interface for interacting with a user, could determine an appropriate level of detail for any assistance provided to the user.

Figure 6:
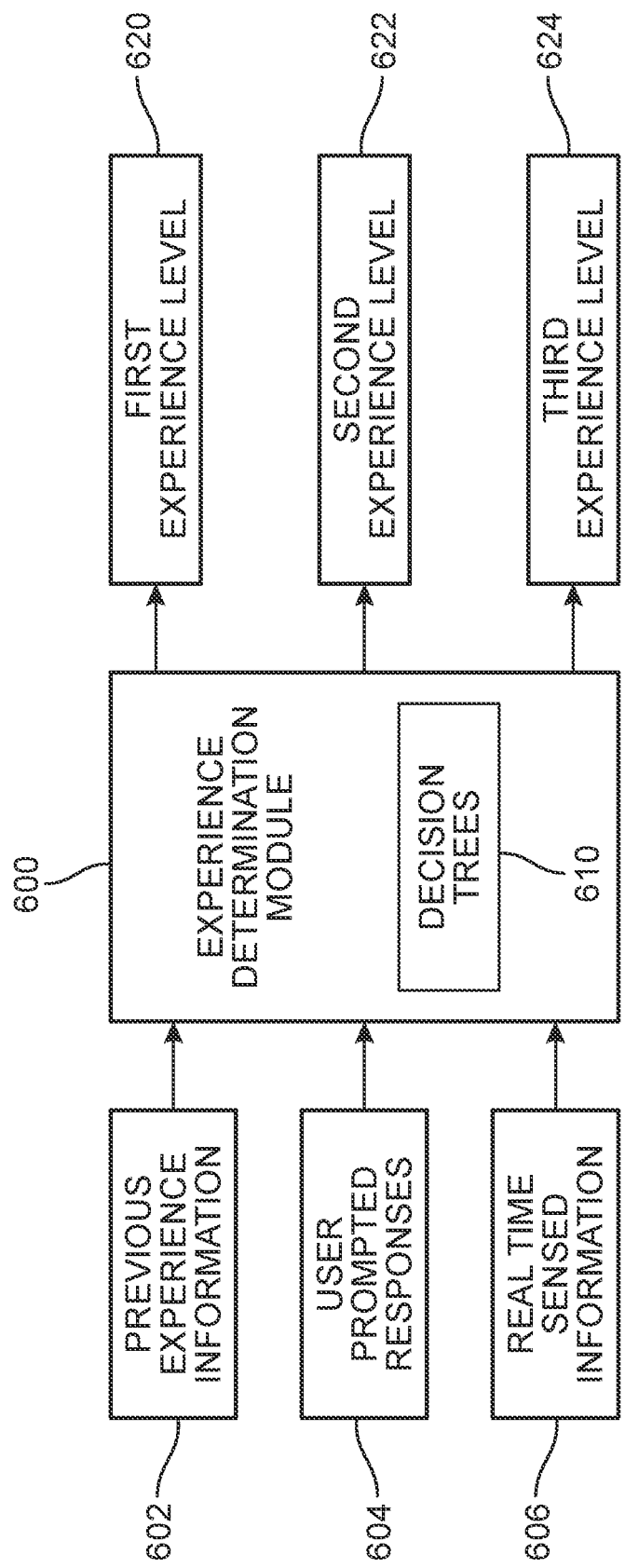
FIG. 6 is a schematic view of an experience determination module, including inputs and outputs for the module, according to an embodiment.

FIG. 6 is a schematic view of an experience determination module 600, including exemplary inputs and outputs. As seen in FIG. 6, experience determination module 600 may take previous experience information 602 and user prompted responses 604 as inputs. Specifically, previous experience information 602 may include any information related to the history of the user performing the process under consideration. As an example, if the user is an insurance adjuster and the task is processing an insurance claim, the system could receive information about how long the adjuster has been working and/or how many claims they have processed, as both may be generally related to a user's experience in performing the given process. Also, user prompted responses 604 could be user responses to explicit prompts such as "how much experience do you have performing this process?". That is, the guide system could prompt the user about their experience/comfort level in performing a given process, and could use the responses as input to experience determination module 600.

In some cases, other suitable inputs, such as real time sensed information 606, could be used as inputs. For example, sensing information about a user's speech patterns or body language could provide some information about a user's experience and/or comfort level in performing a task.

In some embodiments, experience determination module 600 may use one or more machine learning algorithms to provide a predicted experience level for a user. In some cases, experience determination module 600 may use one or more trained decision trees 610 to predict user experience levels from inputs, including any suitable combination of inputs described above.

The output of experience determination module 600 may be a first experience level 620, a second experience level 622, and a third experience level 624. In some cases, first experience level 620 could correspond to "no experience," second experience level 622 could correspond to "some experience," while third experience level 624 could correspond to "significant experience." Moreover, it may be appreciated that in other embodiments any suitable number of distinct experience levels could be used.

Figure 7:
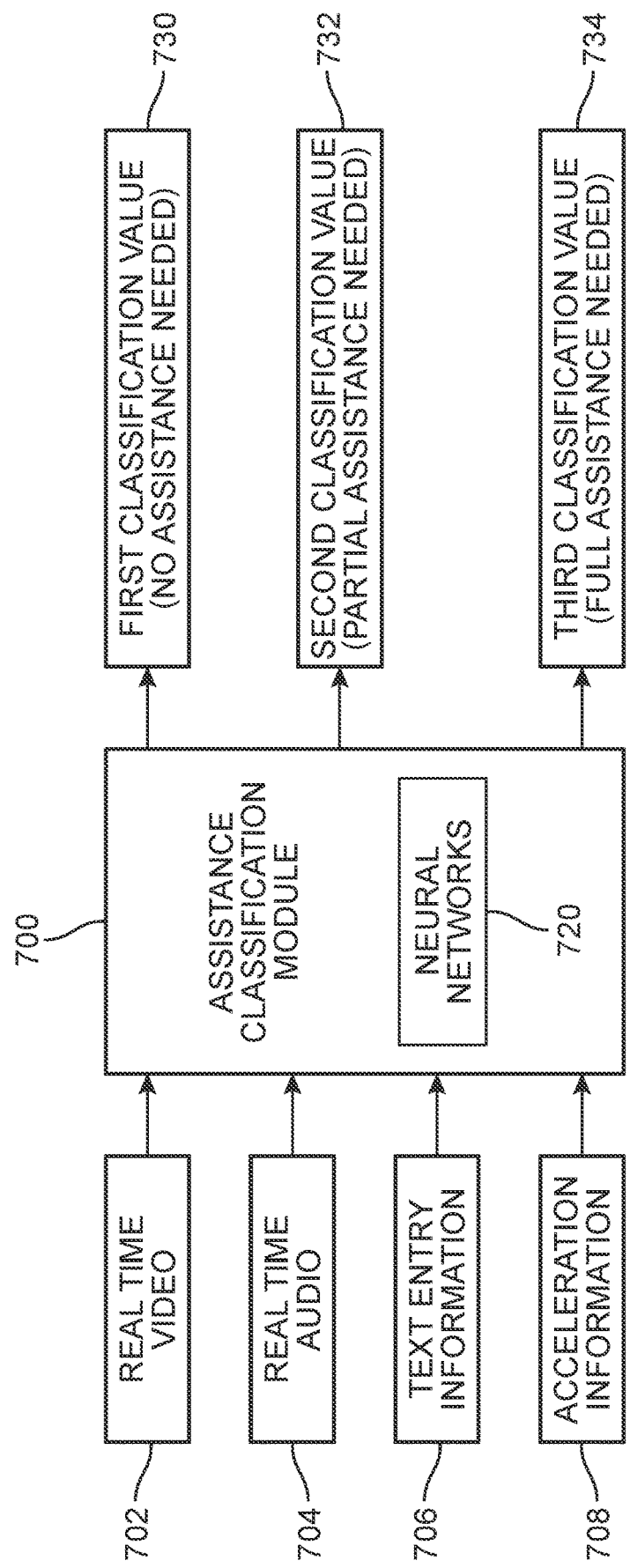
FIG. 7 is a schematic view of an assistance classification module, including inputs and outputs for the module, according to an embodiment.

FIG. 7 is a schematic view of an experience determination module 700, including exemplary inputs and outputs. As seen in FIG. 7, experience determination module 700 may take a variety of different inputs including real time video 702, real time audio 704, text entry information 706, and acceleration information 708. In some cases, these inputs may be received from sensors associated with a user's phone (such as mobile device 404), tablet, wearables (such as AR glasses 406) or other suitable devices that can communicate with a guide system.

The inputs to assistance classification module 700 may be processed using one or more trained machine learning models. In some cases, classification module 700 could predict classification values from the inputs using one or more neural networks 720. Generally, any suitable neural network could be used. Examples include, but are not limited to: feed forward neural networks, convolutional neural networks, recurrent neural networks, long short-term memory neural networks, sequence to sequence models, graph neural networks, and modular neural networks.

Using neural networks 720, classification module 700 may predict one of a first classification value 730, a second classification value 732, or a third classification value 734. In one example, first classification value 730 indicates that no assistance is currently needed. Also, second classification value 732 indicates that partial assistance is needed. Additionally, third classification value 734 indicates that full assistance is needed. As used herein, the terms "partial assistance" and "full assistance" refer to relative actions in which a guide system provides different levels of assistance. Specifically, when a guide system has at least two possible actions for providing guidance to a user during a process, full assistance refers to the action for which the system provides the most detail to the user for completing the process. Partial assistance may be useful in situations where a user has some familiarity with a process but may need simple reminders about the sequence of steps or prompting to start some steps. By contrast, full assistance may be useful in situations where a user has little to no experience, and therefore needs to be walked carefully through each and every step of the process.

Figure 8:
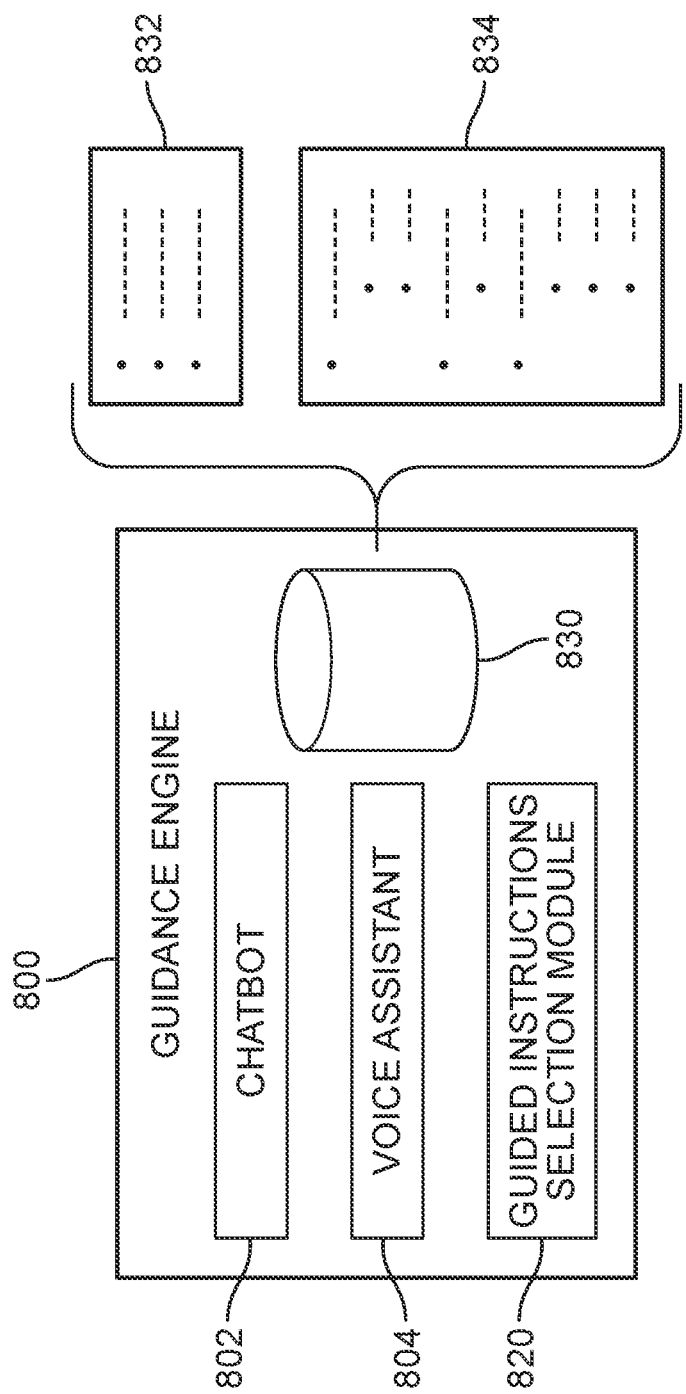
FIG. 8 is a schematic view of a guidance engine, according to an embodiment.

FIG. 8 is a schematic view of a guidance engine 800. In this embodiment, guidance engine 800 could comprise both a chatbot 802 and a voice assistant 804, which allows the guide system to use an appropriate guiding agent depending on the process, channel, and user comfort. For example, if a user is trying to perform a financial transaction using a voice assistant, the system could use a voice assistant to communicate with, and guide, the user through the process. Likewise, if the user is trying to perform a financial transaction on a website or mobile application, the system could use a chatbot to communicate with, and guide, the user through the process.

In some embodiments, guidance engine 800 may further include a guided instructions selection module 820. The purpose of selection module 820 is to determine what information to convey to the user in response to detecting that the user requires assistance. More specifically, selection module 820 may tailor information according to factors such as the user's experience level in performing similar tasks, real time information about the state of the user, context about the user's environment, or other suitable information.

As an example, in FIG. 8, guidance system 800 further includes a database 830 for storing instructions for performing particular tasks. As shown in FIG. 8, a first set of instructions 832 that may be used to guide a user through a particular task may be a shorter set of instructions (that is, fewer total steps) that is provided to a user with some experience. In contrast, a second set of instructions 834 for guiding a user through the same task comprises a longer set of instructions (that is, more total steps) that may be provided to a user with little to know experience in performing similar tasks.

Figure 9:
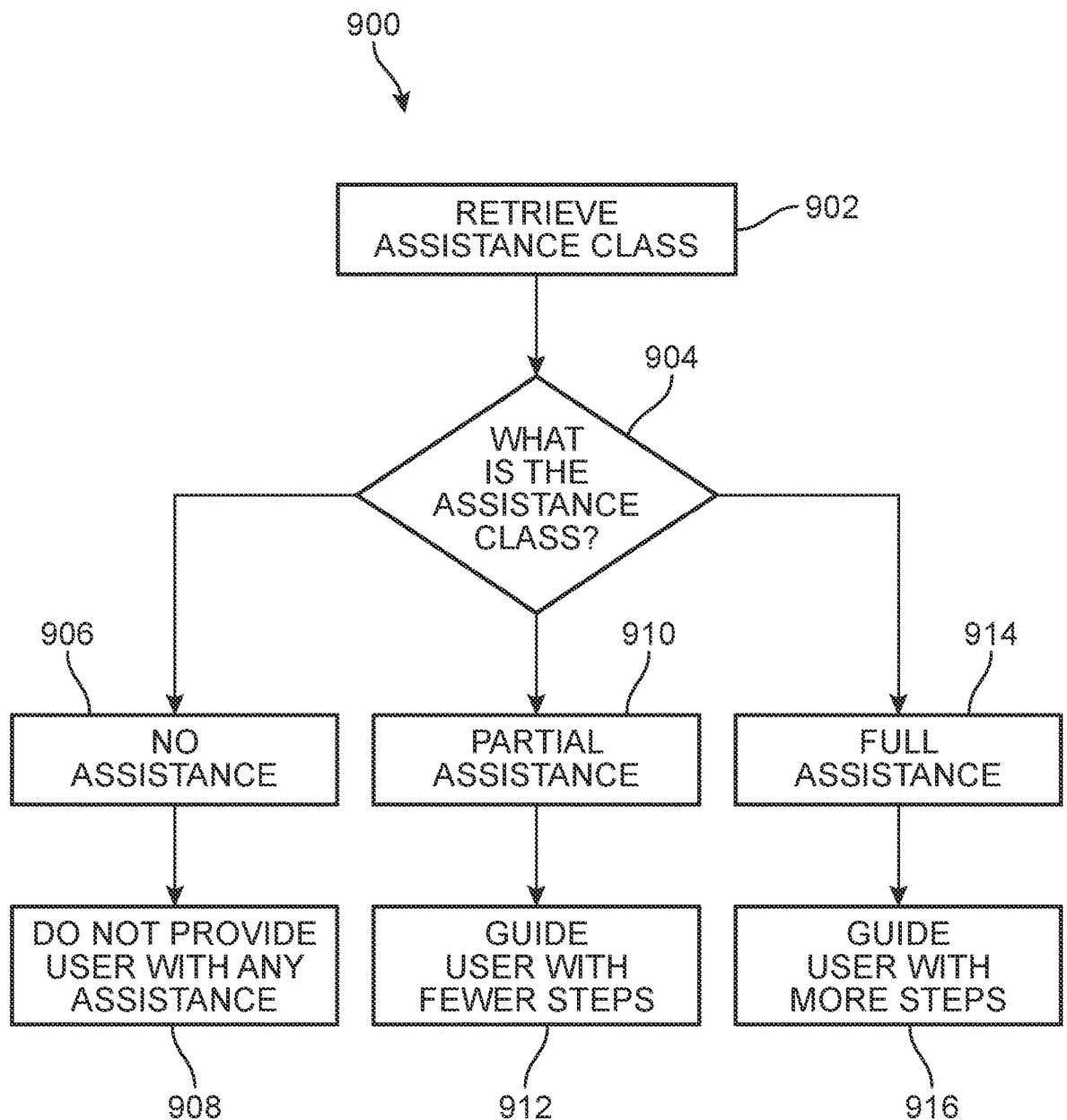
FIG. 9 is a schematic view of a method of providing assistance to a user based on a predicted assistance class, according to an embodiment.

FIG. 9 is a schematic view of a method 900 for providing a user with different levels of assistance (or no assistance) according to the assistance class predicted by an assistance classification module. Starting in step 902, the system may retrieve the assistance class determined by an assistance classification module (such as assistance classification module 460 of FIG. 4). In step 904, the system determines the value of the received assistance class and proceeds according to the value. If the assistance class has a value indicating no assistance, as in step 906, the system proceeds to step 908. In step 908 the system provides no assistance to the user. If the assistance class has a value indicating partial assistance, as in step 910, the system proceeds to step 912. In step 912, the system provides guidance using relatively fewer steps compared to guidance provided when a user needs full assistance. If the assistance class has a value indicating full assistance, as in step 914, the system proceeds to step 916. In step 916, the system provides guidance using relatively more steps compared to guidance provided when a user needs only partial assistance.

Figure 10:
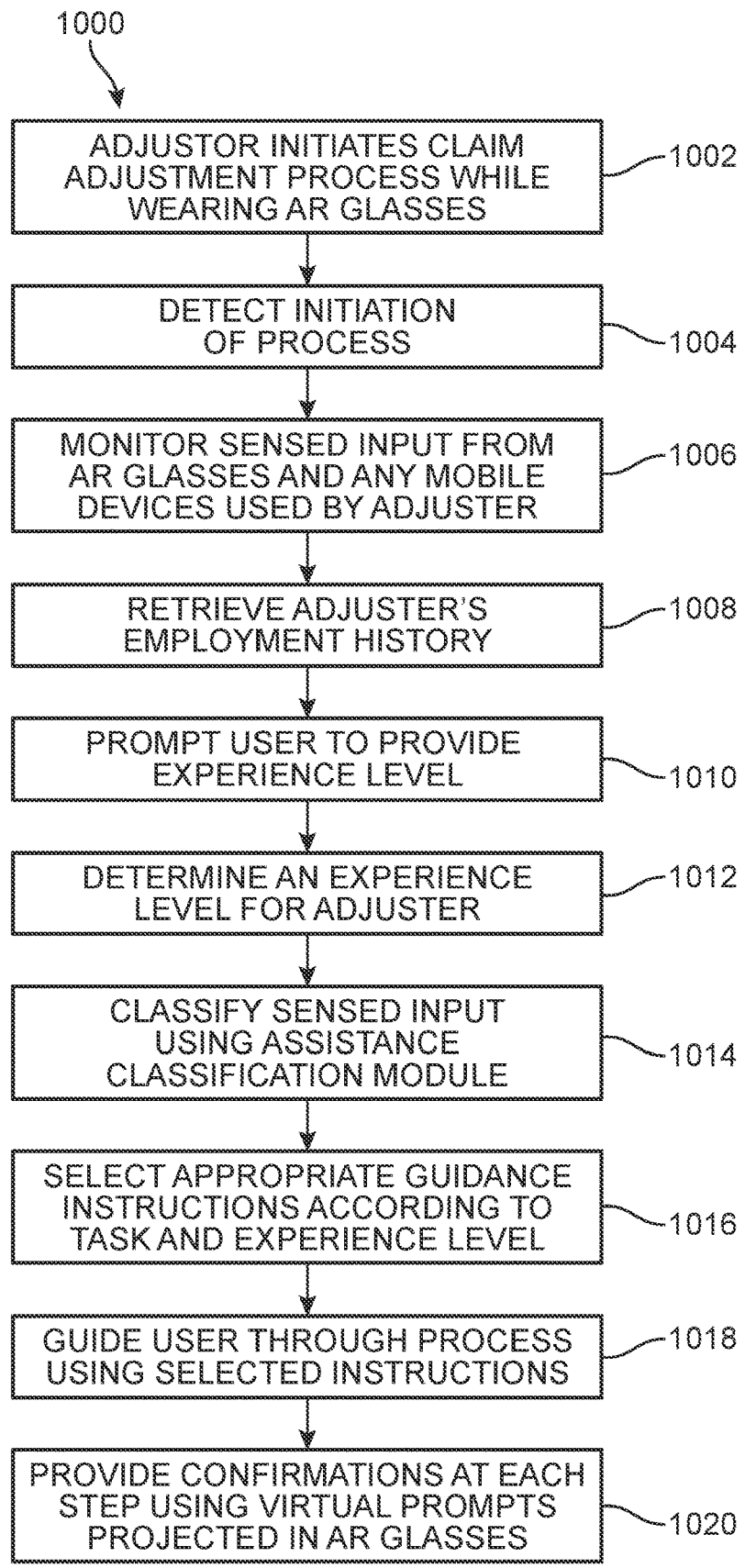
FIG. 10 is a schematic view of a method for providing assistance to a user during an insurance adjustment process, according to an embodiment.

FIG. 10 is a schematic view of a process 1000 for providing a user with assistance while the user is performing a claim adjustment process. In some cases, the user may be an insurance adjuster. In step 1002, an adjuster initiates a claim adjustment process while wearing AR glasses. In step 1004, an augmented intelligence guide system detects initiation of the adjustment process. In step 1006, the system monitors sensed input from the AR glasses and/or any mobile devices used by the adjuster.

In step 1008, the system may retrieve the adjuster's employment history. This could include information about the amount of time the adjuster has worked, the number of claims processed, the accuracy of their claim adjustments, as well as possibly other suitable information. In step 1010, the system may prompt the user to provide an experience level. That is, the system may ask the user to rate their own experience level.

In step 1012, the system determines an experience level for the adjuster based on inputs from step 1008 and from step 1010. In some cases, the experience level could be used by applying decision trees to one or more of these inputs and predicting an experience level.

In step 1014, the system may classify the sensed input using an assistance classification module. In some cases, for example, the sense input and can be fed into a neural network that outputs a predicted assistance class (such as "no assistance needed," "some assistance needed," and "full assistance needed").

In step 1016, the system selects an appropriate set of guidance instructions according to the process, the experience level, and the assistance class predicted in step 1014. The selected instructions are then used to guide the user through the process in step 1018.

In step 1020, the system may provide confirmations at each step of the process using virtual prompts that are projected in the AR glasses, as shown in the example of FIG. 3.

An augmented intelligence guide system of the service provider, such as augmented intelligence guide system 117, may make use of any techniques in the field of machine learning or artificial intelligence for facilitating verbal and/or visual communication with a user. In some embodiments, an augmented intelligence guided assistant could include software making use of natural language processing to process incoming sounds (such as words), interpret the input, and produce audible responses (such as words). More specifically, an augmented intelligence guided assistant could use speech recognition algorithms to process incoming speech, natural language understanding algorithms to determine the content of the speech, and natural language generation algorithms to produce speech that can be understood by a user.

Example Use Cases

The following example use cases illustrate embodiments of the techniques described herein, but other use cases and embodiments may be implemented in accordance with this disclosure.

In one embodiment, the system and method described herein may be used by an insurance adjuster. When insurance adjusters respond to the scene of a claim there is a process they will go through depending on the type of policy (auto, home, medical, etc.) and the type of claim (accident, weather, flood, fire, etc.). This may involve interviews with the insured and other bystanders, assessment of the damage, picture evidence to take, initial cost estimates, disclaimers to be briefed, follow-on member actions to be taken, etc. An augmented intelligence guided assistant according to the techniques described herein could be used to help guide the adjuster through the appropriate process to help them ensure that they cover all activities and requirements of the claims adjustment process during their response. Combining this with augmented reality technology (such as glasses that show the next step in the process, or that highlight areas of a vehicle that should be photographed, for example) would help to enhance the level of service the adjuster provides while also ensuring that the adjuster covers the complete process in one response visit.

In another embodiment, the system and method described herein may also be used by an insurance adjuster for a process for recognizing fraudulent claims. For example, a fire claim response could use an augmented intelligence guided assistant according to the techniques described herein to lead the adjuster to look for certain clues to determine if a fire started through an accident or through insured's negligence or purposeful action. The clues would be like steps of a process highlighting suspicious fire artifacts that the adjuster would look for and either note finding or not finding. It could prompt the adjuster as to what to photograph for further analysis. Normally it takes years of claims experience to recognize the signs of fraud in a claim, but with augmented intelligence guiding the adjuster all can benefit from experience, with an intelligent guiding process to augment the adjuster's experience.

In another embodiment, the system and method described herein may be used by a customer, user, or member completing a financial transaction. In the service provider's mobile app, customers often do not understand user interface (UI) prompts intended to enable self-service transactions. As a result the customer gets frustrated and potentially calls the service provider for help. An augmented intelligence guided assistant according to the techniques described herein could provide augmented guidance in channel as described above, where a check for completion of a step could result in additional guidance specific to the customer based on the actions they are taking (this could be delivered via AR overlay or through a variety of other UI implements). Alternatively, the customer could automatically be pushed to an customer service representative who has contextual understanding and could provide additional help if the customer continues to struggle. Historical learning could be provided back to the service provider to improve customer experience in channel and heighten personalization for the customer.

In still another embodiment, the system and method described herein may be used by automobile adjusters working with third-party vendors (e.g., body shop, mechanics, etc.). The typical interaction between auto adjusters and body shops involves a lot of back and forth, about what is covered vs not covered, the make/model/manufacturer of parts that can be used. An augmented intelligence guided assistant according to the techniques described herein could provide a guided approach through AR to help the body shop quickly look at what is covered, if any replacement parts fall out of coverage, and options to use instead. An insurance automobile adjuster who is less experienced may also benefit from this system in order to ensure nothing gets missed in the estimate process. Also, the system can assist in ensuring that items that are estimated are done so in an accurate manner.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of using an augmented reality enabled device, comprising:
    establishing electronic communication with the augmented reality enabled device when the augmented reality enabled device is being operated by a user;
    receiving information from the augmented reality enabled device indicating that the user has initiated a process;
    monitoring input received from the augmented reality enabled device as the user performs the process, the input being selected from real time video and real time audio data generated by the augmented reality enabled device;
    determining, using an experience determination module, a user level of experience for performing the process based on the input received from the augmented reality enabled device by analyzing information about the user's speech patterns or body language contained in at least one of the real time video data and the real time audio data;
    passing the monitored input and the user level of experience into an assistance classification module and outputting an assistance class value; and
    automatically assisting the user in completing the process based on the outputted assistance class value.

2. The computer implemented method of claim 1, wherein the determining the users level of experience includes retrieving user experience data from a database.

3. The computer implemented method of claim 1, wherein determining the user level of experience includes prompting the user to select an experience level from a set of predetermined experience levels.

4. The computer implemented method of claim 1, wherein the assistance classification module includes a trained neural network that predicts the assistance class value from at least the input from the device.

5. The computer implemented method of claim 1, wherein the experience determination module includes a decision tree.

6. The computer implemented method of claim 1, wherein the process is a claim adjustment process.

7. The computer implemented method of claim 6, wherein assisting the user includes projecting a virtual element onto a screen of the augmented reality enabled device to guide the user.

8. The computer implemented method of claim 6, wherein assisting the user includes projecting a virtual element onto a screen of the augmented reality enabled device to provide feedback to the user as the user successfully completes individual steps in the process.

9. A method of using an augmented reality enabled device, comprising:
   establishing communication with an augmented reality enabled device operated by a user;
   receiving information from the augmented reality device indicating that the user has initiated a process;
   monitoring input received from the augmented reality device as the user performs the process, the input being selected from real time video and real time audio data generated by the augmented reality enabled device;
   determining, using an experience determination module, a user level of experience for performing the process, based on the input received from the augmented reality enabled device by analyzing information about the user's speech patterns or body language contained in at least one of the real time video data and the real time audio data;
   passing the monitored input and the user level of experience into an assistance classification module and outputting an assistance class value; and
   automatically assisting the user in completing the process based on the outputted assistance class value.

10. The computer implemented method according to claim 9, wherein the input received from the augmented reality device is both real time video and real time audio data generated by the augmented reality enabled device.

11. The computer implemented method according to claim 9, wherein the step of determining a user level of experience for performing the process is based on the input received from the augmented reality enabled device and occurs by analyzing information about the user's speech patterns and body language contained in both of the real time video data and the real time audio data received from the augmented reality enabled device.

12. The computer implemented method according to claim 9, wherein the assistance classification module includes a trained neural network that predicts the assistance class value from at least the input received from the augmented reality device.

13. The computer implemented method according to claim 9, wherein the method further includes displaying on the augmented reality enabled device a virtual prompt at each step of the process.

14. The computer implemented method of claim 9, wherein the process is a claim adjustment process.

15. The computer implemented method of claim 9, wherein
   the process is a claim adjustment process; and
   assisting the user includes projecting a virtual element onto a screen of the augmented reality enabled device to guide the user.

16. The computer implemented method of claim 9, wherein
   the process is a claim adjustment process; and
   wherein assisting the user includes projecting a virtual element onto a screen of the augmented reality enabled device to provide feedback to the user as the user successfully completes individual steps in the process.

17. A computing system in electronic communication with an augmented reality enabled device, comprising:
   a device processor;
   a non-transitory computer readable medium storing instructions that when executed by the device processor cause the processor to operate an augmented intelligence guide system comprising;
   a process detection module configured to detect when a user has initiated a process by receiving input from the augmented reality enabled device, the input being selected from real time video and real time audio data generated by the augmented reality enabled device;
   an experience determination module configured to determine a user experience level for the initiated process based on the input received from the augmented reality enabled device by analyzing information about the user's speech patterns or body language contained in at least one of the real time video data and the real time audio data;
   an assistance classification module configured to output an assistance class value in response to the input from the augmented reality enabled device; and
   a guidance engine configured to guide a user through one or more steps of the initiated process when the assistance class value indicates that the user needs assistance.

18. The computing system according to claim 17, wherein the experience determination module includes a trained decision tree for predicting the user experience level.

19. The computing system according to claim 17, wherein the assistance classification module includes a trained neural network for predicting the assistance class value.

20. The computing system according to claim 17, wherein the guidance engine comprises a chat bot.

* * * * *